(12) United States Patent
Dey et al.

(10) Patent No.: US 11,894,881 B2
(45) Date of Patent: Feb. 6, 2024

(54) ADJUSTING ALIGNMENT FOR MICROWAVE TRANSMISSIONS BASED ON AN RL MODEL

(71) Applicant: Telefonaktiebolaget LM Ericsson (publ), Stockholm (SE)

(72) Inventors: Kaushik Dey, Kolkata (IN); Abhishek Sarkar, Bengaluru (IN); Ashis Kumar Roy, Durgapur (IN); Dhiraj Nagaraja Hegde, Bengalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 278 days.

(21) Appl. No.: 17/432,311

(22) PCT Filed: Feb. 20, 2019

(86) PCT No.: PCT/EP2019/054233
§ 371 (c)(1),
(2) Date: Aug. 19, 2021

(87) PCT Pub. No.: WO2020/169195
PCT Pub. Date: Aug. 27, 2020

(65) Prior Publication Data
US 2022/0255642 A1    Aug. 11, 2022

(51) Int. Cl.
*H04B 7/005* (2006.01)
*H04B 7/01* (2006.01)
(Continued)

(52) U.S. Cl.
CPC ........... *H04B 17/318* (2015.01); *H04B 17/12* (2015.01); *H04L 41/16* (2013.01); *H04W 24/02* (2013.01)

(58) Field of Classification Search
CPC .... H04B 17/318; H04B 17/12; H04B 7/2631; H04W 52/0225; H04W 52/0245; H04W 52/0251; H04L 41/16
See application file for complete search history.

(56) References Cited

U.S. PATENT DOCUMENTS 6,836,675 B2    12/2004    Zhang
10,051,486 B2    8/2018    Vilhar
(Continued)

FOREIGN PATENT DOCUMENTS

WO    2009/097282 A1    8/2009

OTHER PUBLICATIONS

International Search Report and Written Opinion issued in International Application No. PCT/EP2019/054233 dated Oct. 15, 2019 (12 pages).
(Continued)

*Primary Examiner* — Tuan Pham
(74) *Attorney, Agent, or Firm* — Rothwell, Figg, Ernst & Manbeck, P.C.

(57) ABSTRACT

It is provided a method for adjusting alignment for microwave transmissions from a microwave transmitter to a microwave receiver based on a reinforcement learning, RL, model. The method comprises the steps of: obtaining state space comprising external state space and internal state space, the external state space comprising at least one value of a parameter related to environmental conditions, and the internal state space relates to alignment of the microwave transmitter; determining an action in an action space, the action space comprising actions to adjust alignment of the microwave transmitter; obtaining a measurement of path loss for a transmission from the microwave transmitter to the microwave receiver; determining a reward value based on the path loss, wherein an increase in path loss results in a
(Continued)

reduced reward value; and adjusting the RL model based on the obtained state space, the determined action and the determined reward value.

18 Claims, 3 Drawing Sheets

(51) Int. Cl.
    *H04B 17/318*     (2015.01)
    *H04B 17/12*     (2015.01)
    *H04L 41/16*     (2022.01)
    *H04W 24/02*     (2009.01)

(56) References Cited

U.S. PATENT DOCUMENTS 10,756,783 B2 *   8/2020   Jeoti .................... H04B 1/7115
10,847,865 B2 *  11/2020   Lee ......................... H01Q 3/08
2008/0055151 A1 *   3/2008   Hudson .............. H04B 7/18515
                                                  342/352

OTHER PUBLICATIONS

Guo, Xueying et al., "Learning-Based Joint Configuration for Cellular Networks", IEEE Internet of Things Journal, vol. 5, No. 6, Dec. 2018 (pp. 4283-4295).

2200/2240/2241 PathAlign-R Test Set for Microwave Antenna Alignment, spectracom, User Manual, Jun. 2012 (57 pages).

Torrello, Fernando, "White Paper: Simplifying the Path Alignment of Microwave Communication Systems" spectracom, May 3, 2012 (3 pages).

Campbell Scientific, Inc., "Line of Sight Obstruction" Application Note, App. Note Code: 3RF-E, 2016 (16 pages).

Karagianni, E.A. et al., "Atmospheric Effects on EM Propagation and Weather Effects on the Performance of a Dual Band Antenna for WLAN Communications", Part B: Electrical Engineering and Computer Science, Nausivios Chora, vol. 5, 2014 (17 pages).

* cited by examiner

ADJUSTING ALIGNMENT FOR MICROWAVE TRANSMISSIONS BASED ON AN RL MODEL

CROSS REFERENCE TO RELATED APPLICATIONS

This application is a 35 U.S.C. § 371 National Stage of International Patent Application No. PCT/EP2019/054233, filed Feb. 20, 2019.

TECHNICAL FIELD

The present disclosure relates to the field of microwave transmissions and in particular to adjusting alignment for microwave transmissions based on a reinforcement learning (RL) model.

BACKGROUND

Microwave links are used as backbone carriers (also known as backhaul) of telecom networks. Outages in links cause network performance to go down, affecting network wide traffic. It is estimated that by 2020, 65% of all sites will be connected by microwave backhaul technology. Any preemptive action that can ensure improved availability of key functionality, such as microwave links, is beneficial to the business.

Microwave links are vulnerable to bad weather, especially heavy rain, or heavy snowfall and often experienced when frequencies are above 10 GHz. Precipitation causes microwaves to refract and hence the communication gets misaligned between the microwave transmitter and the microwave receiver. Even small variations in weather parameters like humidity and temperature affect transmissions. Due to this, microwave transmission problems increase during rainy seasons in tropical regions or winter time in cold climate regions.

Temporary objects like cranes, temporary constructions etc. moving into the Fresnel zone can also cause poor signal reception, due to interference caused from signals bouncing off these objects. If the distance between the microwave transmitter and the microwave receiver is large, lower objects which are not at a great elevation can still cause interference.

U.S. Pat. No. 6,836,675B2 discloses a method for aiming antennas during the installation of microwave communication systems. By computerized link quality monitoring mechanism, the software of the computer system can monitor the link quality of the link during the aiming of the installation. The link quality comprises the performance of data communication status, and the signal strength and noise tests result. However, the proposed solution is not feasible to apply for dynamically changing conditions, such as changing weather conditions or objects moving into the Fresnel zone.

SUMMARY

One objective is to dynamically adjust alignment for microwave transmissions based on environmental conditions.

According to a first aspect, it is provided a method for adjusting alignment for microwave transmissions from a microwave transmitter to a microwave receiver based on a reinforcement learning, RL, model. The method is performed in an alignment adjuster and comprises the steps of: obtaining state space comprising external state space and internal state space, the external state space comprising at least one value of a parameter related to environmental conditions at the microwave transmitter or microwave receiver, and the internal state space comprising at least one value of a parameter related to alignment of the microwave transmitter; determining, based on the RL model and the state space, an action in an action space, the action space comprising actions to adjust alignment of the microwave transmitter; obtaining a measurement of path loss for a transmission from the microwave transmitter to the microwave receiver; determining a reward value based on the path loss, wherein an increase in path loss results in a reduced reward value; and adjusting the RL model based on the obtained state space, the determined action and the determined reward value.

The external state space may be based also on captured images passed through a convolutional neural network model.

The external state space may comprise at least one measurement of the following parameters: ambient temperature, rate of precipitation, humidity, wind speed, wind direction, air pressure.

The internal state space may comprise vertical angle of the microwave transmitter.

The internal state space may comprise horizontal angle of the microwave transmitter.

The internal state space may comprise transmission power of the microwave transmitter.

The step of determining a reward value may comprise determining the reward value also based on the transmission power, wherein, all else equal, an increase in transmission power results in a reduced reward value.

The internal state space may comprise at least one of vertical angle of the microwave receiver and horizontal angle of the microwave receiver.

The method may further comprise the step of: triggering the collection of additional parameters related to environmental conditions when a sequence of successive reward values indicate a performance less than a threshold performance.

The step of triggering may comprise triggering at least one unmanned aerial vehicle to collect environmental data between the microwave transmitter and the microwave receiver.

According to a second aspect, it is provided an alignment adjuster for adjusting alignment for microwave transmissions from a microwave transmitter to a microwave receiver based on a reinforcement learning, RL, model. The alignment adjuster comprises: a processor; and a memory storing instructions that, when executed by the processor, cause the alignment adjuster to: obtain state space comprising external state space and internal state space, the external state space comprising at least one value of a parameter related to environmental conditions at the microwave transmitter or microwave receiver, and the internal state space comprising at least one value of a parameter related to alignment of the microwave transmitter; determine, based on the RL model and the state space, an action in an action space, the action space comprising actions to adjust alignment of the microwave transmitter; obtain a measurement of path loss for a transmission from the microwave transmitter to the microwave receiver; determine a reward value based on the path loss, wherein an increase in path loss results in a reduced reward value; and adjust the RL model based on the obtained state space, the determined action and the determined reward value.

The external state space may be based also on captured images passed through a convolutional neural network model.

The external state space may comprise at least one measurement of the following parameters: ambient temperature, rate of precipitation, humidity, wind speed, wind direction, air pressure.

The internal state space may comprise vertical angle of the microwave transmitter.

The internal state space may comprise horizontal angle of the microwave transmitter.

The internal state space may comprise transmission power of the microwave transmitter.

The instructions to determine a reward value may comprise instructions that, when executed by the processor, cause the alignment adjuster to determine the reward value also based on the transmission power, wherein, all else equal, an increase in transmission power results in a reduced reward value.

The internal state space may comprise at least one of vertical angle of the microwave receiver and horizontal angle of the microwave receiver.

The alignment adjuster may further comprise instructions that, when executed by the processor, cause the alignment adjuster to trigger the collection of additional parameters related to environmental conditions when a sequence of successive reward values indicate a performance less than a threshold performance.

The instructions triggering may comprise triggering at least one unmanned aerial vehicle to collect environmental data between the microwave transmitter and the microwave receiver.

According to a third aspect, it is provided a computer program for adjusting alignment for microwave transmissions from a microwave transmitter to a microwave receiver based on a reinforcement learning, RL, model. The computer program comprises computer program code which, when run on a alignment adjuster causes the alignment adjuster to: obtain state space comprising external state space and internal state space, the external state space comprising at least one value of a parameter related to environmental conditions at the microwave transmitter or microwave receiver, and the internal state space comprising at least one value of a parameter related to alignment of the microwave transmitter; determine, based on the RL model and the state space, an action in an action space, the action space comprising actions to adjust alignment of the microwave transmitter; obtain a measurement of path loss for a transmission from the microwave transmitter to the microwave receiver; determine a reward value based on the path loss, wherein an increase in path loss results in a reduced reward value; and adjust the RL model based on the obtained state space, the determined action and the determined reward value.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 3 is a schematic diagram illustrating the scenario of FIG. 2 where the environmental conditions affecting microwave transmissions have been compensated for;

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
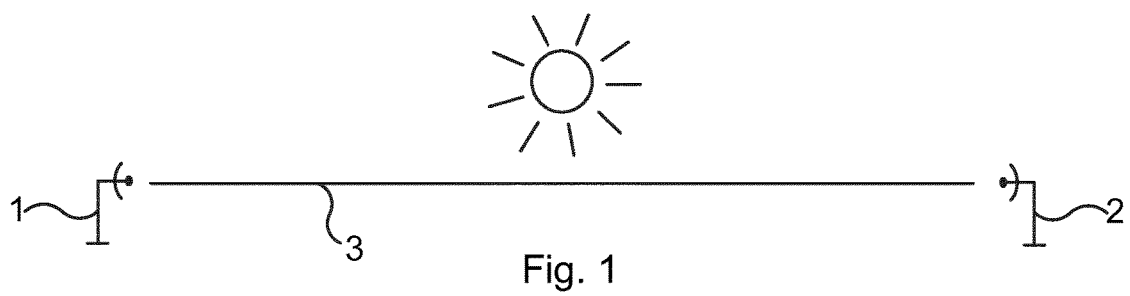
FIG. 1 is a schematic diagram illustrating an environment comprising microwave transmissions in which embodiments presented herein can be applied.

FIG. 1 is a schematic diagram illustrating a microwave link between a microwave transmitter 1 and a microwave receiver 2 for which embodiments presented herein can be applied. A microwave transmitter 1 here transmits microwave transmissions 3 to a microwave receiver 2. The microwave transmissions 3 occur to transfer large amounts of data in a point to point link between the microwave transmitter 1 and the microwave receiver 2 without needing a cable therebetween. The microwave link can e.g. be used as part of a backhaul network for a telecommunication network. Prior to the transmission, the data originates from one or many sources (not shown). After the transmission, the data is routed to one or many destinations (not shown).

In the scenario of FIG. 1, the environment is ideal, symbolised by the sun, and no environmental conditions negatively affect the microwave transmission 3. Environmental conditions include weather conditions such as precipitation (rain or snow), smog, or temporary blocking objects.

Figure 2:
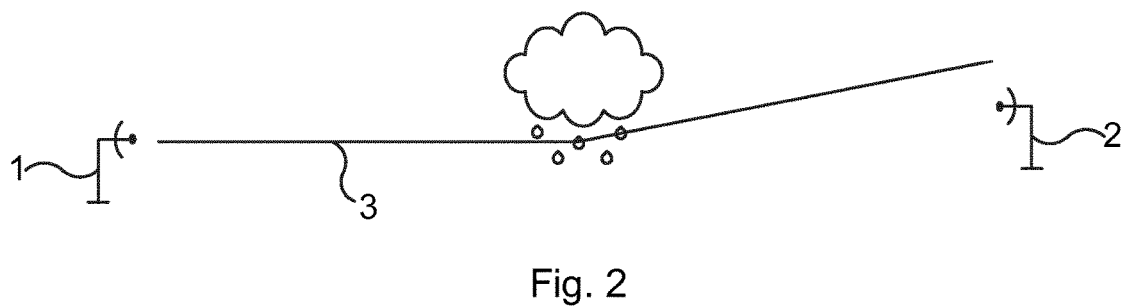
FIG. 2 is a schematic diagram illustrating a scenario where environmental conditions affect microwave transmissions.

FIG. 2 is a schematic diagram illustrating a scenario where environmental conditions affect microwave transmissions. In this scenario, there is rainfall between the microwave transmitter 1 and the microwave receiver 2, which deflects at least some of the microwave transmissions 3. This reduces the quality of the signal received at the microwave receiver 2, which can reduce throughput or have other negative effects on the microwave link.

Figure 3:
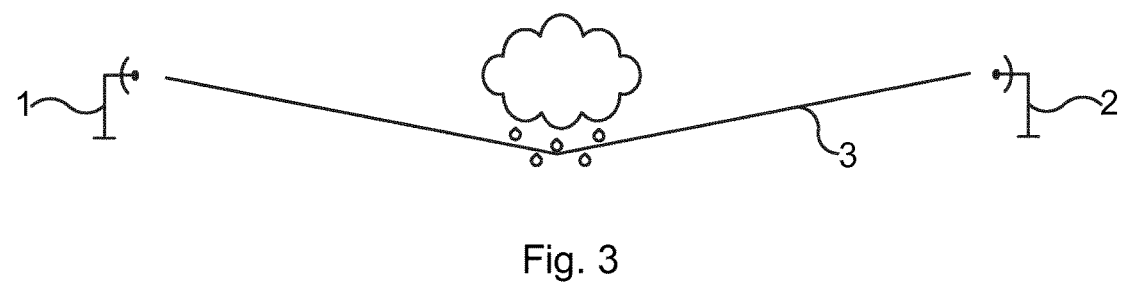

FIG. 3 is a schematic diagram illustrating the scenario of FIG. 2 where the environmental conditions affecting microwave transmissions have been compensated for. The environmental conditions are here the same as in FIG. 2, i.e. rainfall, but the microwave transmitter 1 here directs transmissions in the other direction, compared to the effect of the rainfall deflection. In this way, the microwave transmission 3 is received with better quality at the microwave receiver 2.

An issue with such a compensation is that the alignment adjustment depends on current environmental conditions. Hence, the alignment should to be dynamically adjusted, to adapt to changing conditions.

Figure 4:
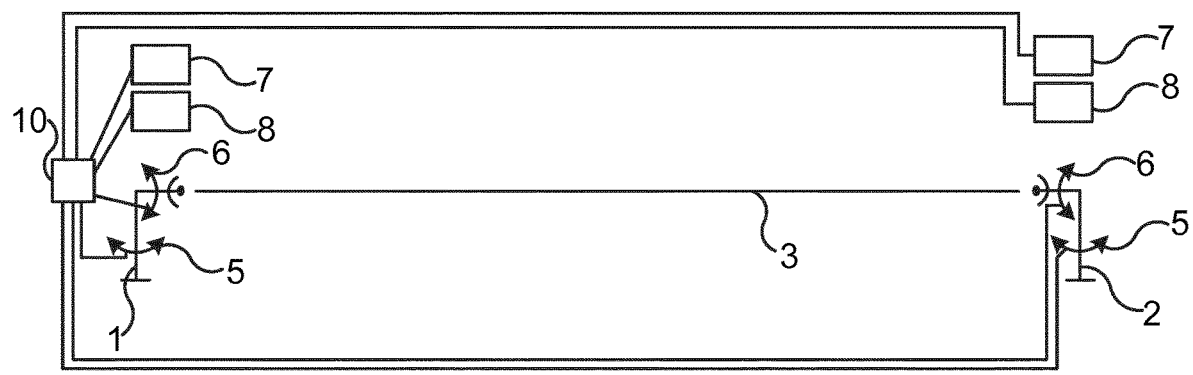
FIG. 4 is a schematic diagram illustrating in more detail a microwave transmission system which can be used in FIG. 3.

FIG. 4 is a schematic diagram illustrating in more detail a microwave transmission system which can be used in FIG. 3. Again, the microwave transmitter 1 here sends a microwave transmission 3 to the microwave receiver 2.

Environmental conditions are captured at the microwave transmitter 1 and/or at the microwave receiver 2. For this purpose, at the site of the microwave transmitter 1, there are one or more weather sensors 7 and/or one or more cameras 8. Analogously, at the site of the microwave receiver 2 there can be weather sensor(s) 7 and/or a camera(s) 8. Images from the cameras(s) 8 can be used to determine current environmental conditions, e.g. by determining the presence or absence of rain, snow or fog. The weather sensor(s) can e.g. be used to measure humidity, temperature, wind direction and strength, precipitation etc. A path loss meter of the microwave receiver 2 is used to record the strength of the received signal.

The environmental conditions, captured by the one or more weather sensors 7 and one or more cameras 8, are provided to an alignment adjuster 10. In this embodiment, the alignment adjuster 10 is provided on the microwave transmitter 1 side. Also the path loss is fed to the alignment adjuster 10. The alignment adjuster 10 determines, as described in more detail below, any adjustment of alignment that is to occur, based on an RL model.

Alignment of the microwave transmitter 1 is then adjusted by the alignment adjuster 10 sending a signal to control a motor to adjust a horizontal angle 5, i.e. azimuth, of the transmission direction. Alternatively or additionally, alignment of the microwave transmitter 1 can be adjusted by the alignment adjuster 10 sending a signal to control a motor to adjust a vertical angle 6 of the transmission direction.

Optionally, alignment on the receiver side is also adjusted. In such a case, alignment of the microwave receiver 2 is adjusted by the alignment adjuster 10 sending a signal to control a motor to adjust a horizontal angle 5, i.e. azimuth, of the direction of receiving. Alternatively or additionally, alignment of the microwave receiver 2 can be adjusted by the alignment adjuster 10 sending a signal to control a motor to adjust a vertical horizontal angle 6 of the direction of receiving.

As described in more detail below, the alignment is here adjusted based on a reinforcement learning (RL) model. In the RL model, parameters describing environmental conditions form part of the current state. The vertical and/or horizontal angle of the microwave transmitter (and optionally of the microwave receiver) is the action of RL model.

The path loss is used to calculate the reward. The better the alignment adjustment for the given state, the lower the path loss is, which is results in a higher reward.

The RL model is trained by modelling a value function which assigns a negative reward for increase in misalignment. The magnitude of negative reward can be proportional to degree of reduction in transmission. When initially started, the RL model can be trained using simulation data. The training of the RL model can also involve assigning weights for combining the sensors data and the data for the pictures. Once the RL model is active, the weights are automatically determined by the RL model in the process of the maximising of the reward.

Figure 5A:
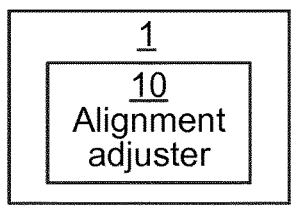
FIGS. 5A-C are schematic diagrams illustrating embodiments of where the alignment adjuster of FIG. 4 can be implemented.
Figure 5B:
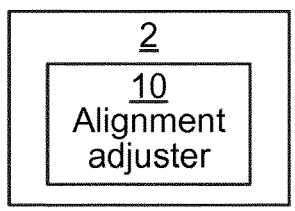
Figure 5C:
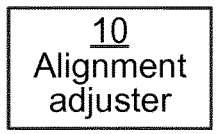

FIGS. 5A-C are schematic diagrams illustrating embodiments of where the alignment adjuster 10 of FIG. 4 can be implemented.

In FIG. 5A, the alignment adjuster to is shown as implemented in the microwave transmitter 1. The microwave transmitter ns thus the host device for the alignment adjuster to in this implementation.

In FIG. 5B, the alignment adjuster to is shown as implemented in the microwave receiver 2. The microwave receiver 2 is thus the host device for the alignment adjuster to in this implementation.

In FIG. 5C, the alignment adjuster to is shown as implemented as a stand-alone device. The alignment adjuster 10 thus does not have a host device in this implementation. Optionally, the alignment adjuster 10 is distributed over several physical devices, performing different functions mentioned below to be performed by the alignment adjuster 10.

Figures 6A, 6B:
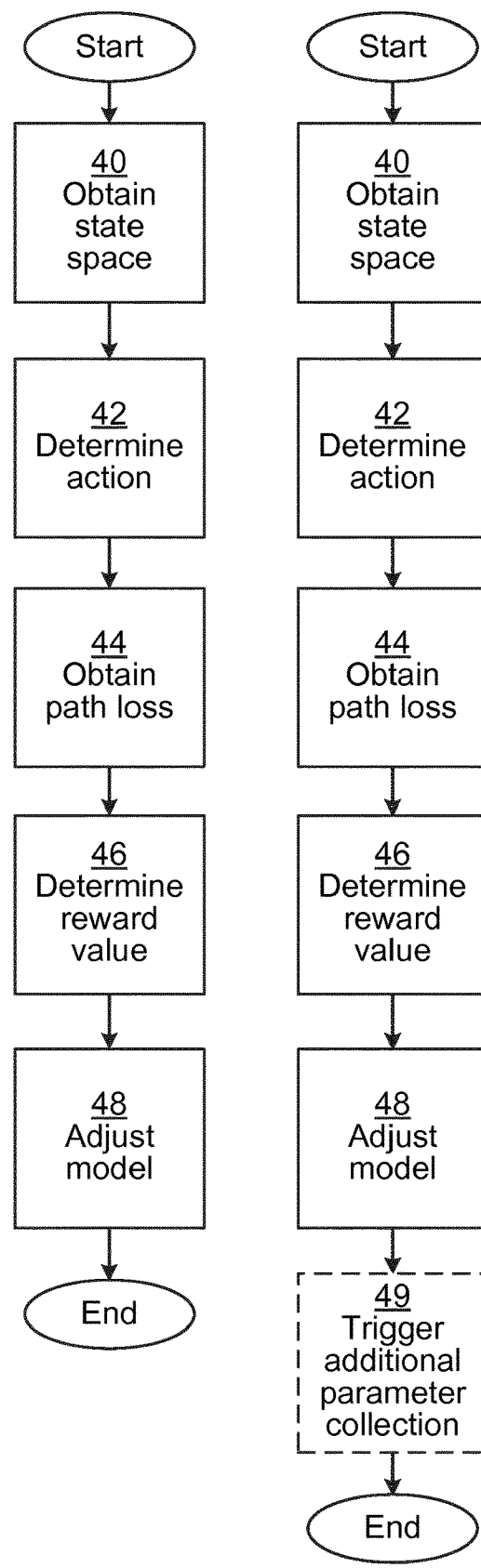
FIGS. 6A-B are flow charts illustrating embodiments of methods for adjusting alignment for microwave transmissions from a microwave transmitter to a microwave receiver based on a reinforcement learning model.

FIGS. 6A-B are flow charts illustrating embodiments of methods for adjusting alignment for microwave transmissions from a microwave transmitter to a microwave receiver based on an RL model. The method is performed in the alignment adjuster. First, the methods illustrated by FIG. 6A will be described.

In an obtain state space step 40, the alignment adjuster obtains state space. The state space comprises external state space and internal state space. The external state space comprises at least one value of a parameter related to environmental conditions at the microwave transmitter or microwave receiver. The internal state space comprises at least one value of a parameter related to alignment of the microwave transmitter.

In one embodiment, the external state space comprises at least one measurement of the following parameters: ambient temperature, rate of precipitation, humidity, wind speed, wind direction, and air pressure.

In one embodiment, the internal state space comprises vertical angle of the microwave transmitter and/or horizontal angle of the microwave transmitter. The internal state space can also comprise vertical angle of the microwave receiver and/or horizontal angle of the microwave receiver.

In one embodiment, the internal state space comprises transmission power of the microwave transmitter.

The state space varies over time and each set of state space is associated with a particular time t. Hence, the state space can be expressed as $S_t=[S_t^I, S_t^E]$, where $S_t^I$ represents the internal state space and $S_t^E$ represents the external state space.

The internal state space is given by $S_t^I=[\theta_{vertical}, \theta_{horizontal}, \omega]$, that is the vertical and horizontal angles $\theta$ of the transmitter and other antenna parameters $\omega$, like signal strength. Optionally, parameters for the angles of the receiver can also form part of the internal state space.

The external state space is expressed as $S_t^E$.

In one embodiment, the external state space is based also on captured images passed through a neural network comprising a convolutional neural network model. The input to the neural network comprises a captured image (which could be from the transmitter or the receiver end), optionally along with weather parameter values and a current reward value. The first layers of the network are composed of a convolutional neural network (CNN) model to enable processing the images. The final layers of the neural network are composed of fully connected networks to enable choosing the appropriate action based on the image and weather readings.

The neural network converts the captured images to weather information between the microwave transmitter and the microwave receiver. The use of the neural network for the images can be useful for improving performance of the RL model when it is possible to obtain more information from the images than what the sensor can capture about the weather or environmental conditions between the microwave transmitter and the microwave receiver. One such example is when it is not raining either at the receiver or transmitter end (where the sensors are placed) but it is raining at some point in between the two, and this phenomenon can be identified from captured images.

In a determine action step 42, the alignment adjuster determines, based on the RL model and the state space, an action in an action space. The action space comprises actions to adjust alignment of the microwave transmitter.

More formally, the action space $A_t$ can be defined according to the following, where all mentioned parameters are not necessary:

$$A_t = \{\Delta\theta_{horizontal}^{T+}, \Delta\theta_{horizontal}^{T-}, \Delta\theta_{horizontal}^{T0}\} \times \{\Delta\theta_{vertical}^{T+}, \Delta\theta_{vertical}^{T-}, \Delta\theta_{vertical}^{T0}\} \times \{\Delta P^+, \Delta P^-, \Delta P^0\} \times \{\Delta\theta_{horizontal}^{R+}, \Delta\theta_{horizontal}^{R-}, \Delta\theta_{horizontal}^{R0}\} \times \{\Delta\theta_{vertical}^{R+}, \Delta\theta_{vertical}^{R-}, \Delta\theta_{vertical}^{R0}\}$$

For any given state $S_t$, we are given at least three possible actions of rotations of the transmitter alignment in the horizontal (azimuth) direction (no change, clockwise, anti-clockwise). Analogously, there are actions of rotations in the vertical direction. The same set of actions are possible for the receiving antenna as well. Apart from the rotation of the antenna we have the possibility of increasing, decreasing or making no change in the signal strength of the antenna.

In an obtain path loss step 44, the alignment adjuster obtains a measurement of path loss for a transmission from the microwave transmitter to the microwave receiver.

In a determine reward value step 46, the alignment adjuster determines a reward value based on the path loss. An increase in path loss results in a reduced reward value, and vice versa. Additionally, the reward value can be determined based on the transmission power, wherein, all else equal, an increase in transmission power results in a reduced reward value, and vice versa. In other words, the reward function can be expressed as r=f(pathloss, TransmissionPower).

As explained above, there is a path loss meter which measures the quality of signal received by the receiver, i.e. the path loss. The lower the path loss is, the higher is the reward. Optionally, the reward function is defined such that when the path loss is higher than a threshold (threshold when the signal is no longer useful for the transmitter), then a very high negative reward is given, in order to prevent signal loss. At the same time, all else equal, the higher the transmission power of the signal being used is, the lower is the reward. Using such reward function, lower path loss is achieved with low energy expenditure at the transmitter end.

In an adjust model step 48, the alignment adjuster adjusts the RL model based on the obtained state space, the determined action and the determined reward value. In this way, the RL model adapts over time to improve its performance.

Looking now to FIG. 6B, only new or modified steps compared to the steps of FIG. 6A will be described.

In an optional trigger additional parameter collection step 49, the alignment adjuster triggers the collection of additional parameters related to environmental conditions when a sequence of successive reward values indicate a performance less than a threshold performance. This can comprise triggering at least one unmanned aerial vehicle (UAV) to collect environmental data between the microwave transmitter and the microwave receiver which can then be used for determining alignment adjustments. In other words, when performance is substandard, UAVs are used to obtain more data which is then used to improve the performance of the RL model.

Regardless of whether step 49 is performed or note, the method is repeated, to again adjust alignment in response to changed environmental conditions. This allows the alignment to dynamically adapt to changing precipitation or other changing conditions.

Embodiments presented herein are useful for any type of communication where environmental conditions affect transmissions, and as such is particularly useful for 5G (fifth generation) technology since the number of microwave transmitters is greatly increased in 5G, leading to increased number of misalignments due to rain or strong wind.

The embodiments presented herein improve the quality of microwave transmission without any need for any manual operations. This allows dynamic and automatic adjustment to changing conditions, e.g. change in weather or interfering objects entering the Fresnel zone.

Figure 7:
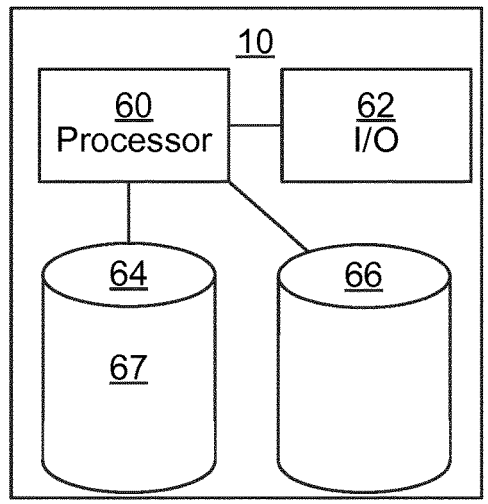
FIG. 7 is a schematic diagram illustrating components of the alignment adjuster of FIG. 4 and FIGS. 5A-C according to one embodiment.

FIG. 7 is a schematic diagram illustrating components of the alignment adjuster to of FIG. 4 and FIGS. 5A-C according to one embodiment. It is to be noted that one or more of the mentioned components can be shared with the host device. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 6 above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The alignment adjuster to further comprises an I/O interface 62 for communicating with external and/or internal entities. Optionally, the I/O interface 62 also includes a user interface.

Other components of the alignment adjuster to are omitted in order not to obscure the concepts presented herein.

Figure 8:
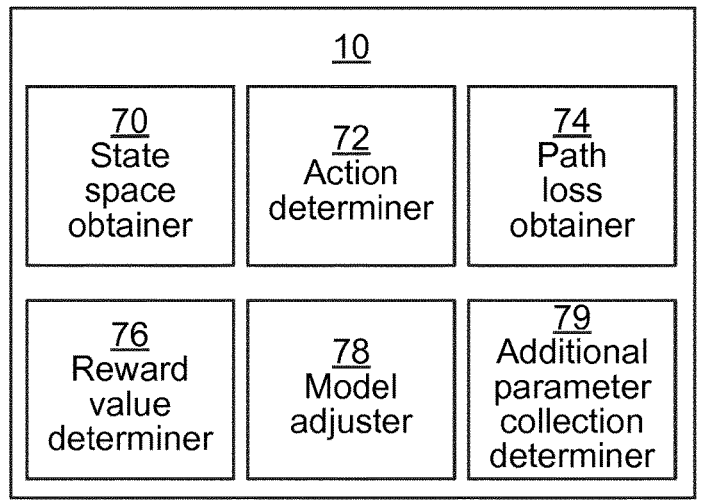
FIG. 8 is a schematic diagram showing functional modules of the alignment adjuster of FIG. 7 according to one embodiment.

FIG. 8 is a schematic diagram showing functional modules of the alignment adjuster of FIG. 7 according to one embodiment. The modules are implemented using software instructions such as a computer program executing in the alignment adjuster 10. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 6A and 6B.

A state space obtainer 70 corresponds to step 40. An action determiner 72 corresponds to step 42. A path loss determiner 74 corresponds to step 44. A reward value determiner 76 corresponds to step 46. A model adjuster 78 corresponds to step 48. An additional parameter collection determiner 79 corresponds to step 49.

Figure 9:
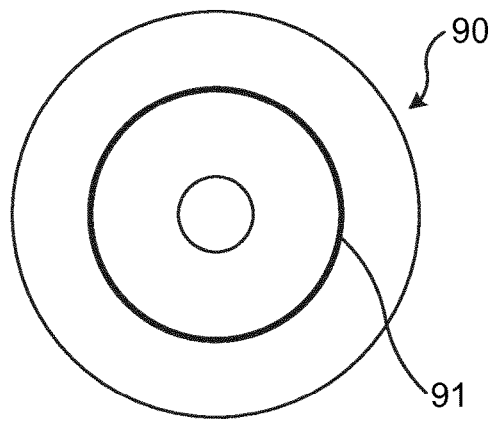
FIG. 9 shows one example of a computer program product comprising computer readable means.

FIG. 9 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for adjusting alignment for microwave transmissions from a microwave transmitter to a microwave receiver based on a reinforcement learning (RL) model, the method being performed in an alignment adjuster and comprising the steps of:
    obtaining state space comprising external state space and internal state space, the external state space comprising at least one value of a parameter related to environmental conditions at the microwave transmitter or microwave receiver, and the internal state space comprising at least one value of a parameter related to alignment of the microwave transmitter;
    determining, based on the RL model and the state space, an action in an action space, the action space comprising actions to adjust alignment of the microwave transmitter;
    obtaining a measurement of path loss for a transmission from the microwave transmitter to the microwave receiver;
    determining a reward value based on the path loss, wherein an increase in path loss results in a reduced reward value; and
    adjusting the RL model based on the obtained state space, the determined action and the determined reward value.

2. The method of claim 1, wherein the external state space is based also on captured images passed through a convolutional neural network model.

3. The method of claim 1, wherein the external state space comprises at least one measurement of the following parameters: ambient temperature, rate of precipitation, humidity, wind speed, wind direction, air pressure.

4. The method of claim 1, wherein the internal state space comprises transmission power of the microwave transmitter.

5. The method of claim 4, wherein the step of determining a reward value comprises determining the reward value also based on the transmission power, wherein, all else being equal, an increase in transmission power results in a reduced reward value.

6. The method of claim 1, wherein the internal state space comprises at least one of vertical angle of the microwave receiver and horizontal angle of the microwave receiver.

7. The method of claim 1, further comprising the step of:
    triggering the collection of additional parameters related to environmental conditions when a sequence of successive reward values indicate a performance less than a threshold performance.

8. An alignment adjuster for adjusting alignment for microwave transmissions from a microwave transmitter to a microwave receiver based on a reinforcement learning (RL) model, the alignment adjuster comprising:
    a processor; and
    a memory wherein the alignment adjuster is configured to:
    obtain state space comprising external state space and internal state space, the external state space comprising at least one value of a parameter related to environmental conditions at the microwave transmitter or microwave receiver, and the internal state space comprising at least one value of a parameter related to alignment of the microwave transmitter;
    determine, based on the RL model and the state space, an action in an action space, the action space comprising actions to adjust alignment of the microwave transmitter;
    obtain a measurement of path loss for a transmission from the microwave transmitter to the microwave receiver;
    determine a reward value based on the path loss, wherein an increase in path loss results in a reduced reward value; and
    adjust the RL model based on the obtained state space, the determined action and the determined reward value.

9. The alignment adjuster of claim 8, wherein the external state space is based also on captured images passed through a convolutional neural network model.

10. The alignment adjuster to of claim 8, wherein the external state space comprises at least one measurement of the following parameters: ambient temperature, rate of precipitation, humidity, wind speed, wind direction, air pressure.

11. The alignment adjuster of claim 8, wherein the internal state space comprises vertical angle of the microwave transmitter.

12. The alignment adjuster of claim 8, wherein the internal state space comprises horizontal angle of the microwave transmitter.

13. The alignment adjuster of claim 8, wherein the internal state space comprises transmission power of the microwave transmitter.

14. The alignment adjuster of claim 13, wherein the instructions to determine a reward value comprise instructions that, when executed by the processor, cause the alignment adjuster to determine the reward value also based on the transmission power, wherein, all else equal, an increase in transmission power results in a reduced reward value.

15. The alignment adjuster of claim 8, wherein the internal state space comprises at least one of vertical angle of the microwave receiver and horizontal angle of the microwave receiver.

16. The alignment adjuster of claim 8, further comprising instructions that, when executed by the processor, cause the alignment adjuster to trigger the collection of additional parameters related to environmental conditions when a sequence of successive reward values indicate a performance less than a threshold performance.

17. The alignment adjuster of claim 16, wherein the instructions triggering comprises triggering at least one unmanned aerial vehicle to collect environmental data between the microwave transmitter and the microwave receiver.

18. A non-transitory computer readable medium storing a computer program for adjusting alignment for microwave transmissions from a microwave transmitter to a microwave receiver based on a reinforcement learning (RL) model, the computer program comprising computer program code which, when run on an alignment adjuster, causes the alignment adjuster to:

obtain state space comprising external state space and internal state space, the external state space comprising at least one value of a parameter related to environmental conditions at the microwave transmitter or microwave receiver, and the internal state space comprising at least one value of a parameter related to alignment of the microwave transmitter;

determine, based on the RL model and the state space, an action in an action space, the action space comprising actions to adjust alignment of the microwave transmitter;

obtain a measurement of path loss for a transmission from the microwave transmitter to the microwave receiver;

determine a reward value based on the path loss, wherein an increase in path loss results in a reduced reward value; and adjust the RL model based on the obtained state space, the determined action and the determined reward value.

* * * * *